United States Patent
Cunha et al.

(10) Patent No.: US 8,215,374 B2
(45) Date of Patent: Jul. 10, 2012

(54) PERIPHERAL MICROCIRCUIT SERPENTINE COOLING FOR TURBINE AIRFOILS

(75) Inventors: Frank J. Cunha, Avon, CT (US); William Abdel-Messeh, Middletown, CT (US)

(73) Assignee: United Technologies Corporation, Hartford, CT (US)

(*) Notice: Subject to any disclaimer, the term of this patent is extended or adjusted under 35 U.S.C. 154(b) by 4 days.

(21) Appl. No.: 12/780,016

(22) Filed: May 14, 2010

(65) Prior Publication Data
US 2010/0221098 A1 Sep. 2, 2010

Related U.S. Application Data

(62) Division of application No. 11/269,030, filed on Nov. 8, 2005, now Pat. No. 7,744,347.

(51) Int. Cl.
*B22C 9/10* (2006.01)
(52) U.S. Cl. .................................................. 164/369
(58) Field of Classification Search .............. 164/369, 164/370
See application file for complete search history.

(56) References Cited

U.S. PATENT DOCUMENTS

| 3,191,908 | A | 6/1965 | Powell et al. |
| 3,849,025 | A | 11/1974 | Grondahl |
| 4,786,233 | A | 11/1988 | Shizuya et al. |
| 5,484,258 | A | 1/1996 | Isburgh et al. |
| 6,247,896 | B1 | 6/2001 | Auxier et al. |
| 6,402,470 | B1 | 6/2002 | Kvasnak et al. |
| 6,637,500 | B2 * | 10/2003 | Shah et al. ............... 164/369 |
| 6,668,906 | B2 * | 12/2003 | Burd ........................ 164/302 |
| 6,705,836 | B2 | 3/2004 | Bourriaud et al. |
| 7,108,045 | B2 * | 9/2006 | Wiedemer et al. ........ 164/369 |
| 7,172,012 | B1 * | 2/2007 | Memmen ................... 164/45 |
| 7,744,347 | B2 * | 6/2010 | Cunha et al. ............ 416/97 R |

FOREIGN PATENT DOCUMENTS

| EP | 1063388 A2 | 12/2000 |
| EP | 1091092 A2 | 4/2001 |
| EP | 1375824 A2 | 1/2004 |
| EP | 1543896 A2 | 6/2005 |
| GB | 2358226 A | 7/2001 |
| JP | 60135606 A | 7/1985 |
| JP | 62282102 A | 12/1987 |
| WO | 03042503 A1 | 5/2003 |

* cited by examiner

*Primary Examiner* — Kevin P Kerns
(74) *Attorney, Agent, or Firm* — Bachman & LaPointe, P.C.

(57) ABSTRACT

A turbine component has an airfoil portion with at least one central core element, a pressure side wall, and a suction side wall. The airfoil portion also has a serpentine cooling passageway in at least one of the walls. In a preferred embodiment, the airfoil portion has a serpentine cooling passageway in both of the pressure and suction side walls. A refractory metal core for forming the serpentine cooling passageway(s) is also described.

8 Claims, 3 Drawing Sheets

PERIPHERAL MICROCIRCUIT SERPENTINE COOLING FOR TURBINE AIRFOILS

This application is a divisional application of U.S. patent application Ser No. 11/269,030, filed Nov. 8, 2005, entitled PERIPHERAL MICROCIRCUIT SERPENTINE COOLING FOR TURBINE AIRFOILS, to Frank J. Cunha et al., now U.S. Pat. Ser. No. 7,744,347.

BACKGROUND OF THE INVENTION (1) Field of the Invention

The present invention relates to a peripheral microcircuit serpentine cooling scheme for use in airfoil portions of turbine engine components, particularly high pressure turbine blade airfoils.

(2) Prior Art

Gas turbine engines are frequently used for small military applications and helicopter applications. The gas turbine engines used in these applications have high pressure turbine blades whose airfoil portions require the use of cooling fluids due to the temperatures at which these engines are asked to perform. In current applications, operating temperatures have increased to values above 3100 degrees Fahrenheit. As a result, the airfoil portions require an improved cooling strategy.

SUMMARY OF THE INVENTION

In accordance with the present invention, a turbine engine component has an airfoil portion which is provided with a cooling scheme which minimizes the use of cooling flow but increases the cooling efficiency.

A turbine engine component in accordance with the present invention broadly comprises an airfoil portion having at least one central core element, a pressure side wall, and a suction side wall, and a serpentine cooling passageway in at least one of the walls. In a preferred embodiment of the present invention, a serpentine cooling passageway is provided in each of the pressure and suction side walls.

A refractory metal core for forming a cooling passageway in an airfoil portion of a turbine engine component is also provided in accordance with the present invention. The refractory metal core has a serpentine configuration.

Still further, a process for forming an airfoil portion of a turbine engine component is provided in accordance with the present invention. The process broadly comprises the steps of placing at least one silica core for forming a central core element in a die, placing at least one refractory metal core element for forming at least one serpentine cooling passageway in the die, and forming the turbine engine component by introducing a molten metal material into the die so that the metal material flows around the at least one silica core and the at least one refractory metal core element so as to form an airfoil portion having a pair of peripheral skin walls and at least one serpentine cooling passageway in one of the peripheral skin walls.

Other details of the peripheral microcircuit serpentine cooling for turbine airfoils, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
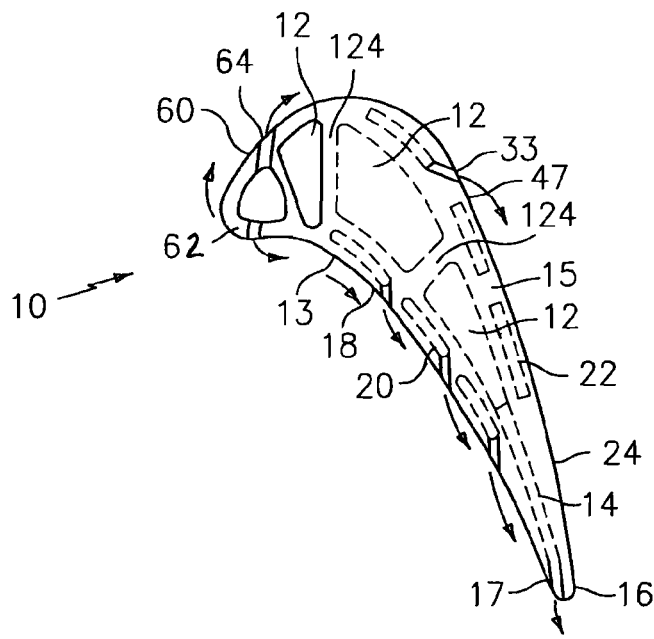
FIG. 1 is a sectional view of an airfoil portion of a turbine engine component.

Referring now to the drawings, FIG. 1 is a cross sectional view of an airfoil portion 10 of a turbine engine component such as a high pressure turbine blade or vane. The airfoil portion has a leading edge 60, a trailing edge 16, a pressure side 18, and a suction side 24.

As can be seen from FIG. 1, the airfoil portion 10 may be provided with three microcircuits for cooling. A first microcircuit 14 may be used to cool the trailing edge 16 with one or more ejection slots 17 being located on the pressure side 18 of the airfoil portion 10. A second microcircuit 20 may be located on the pressure side 18 of the airfoil portion 10. A third microcircuit 22 may be located on the suction side 24 of the airfoil portion 10.

The airfoil portion 10 has one or more central core elements 12. Each of the central core elements 12 communicates with a source (not shown) of cooling fluid, such as engine bleed air, via inlets (not shown). Peripheral skin walls 13 and 15 extend between the central core elements 12 and the external surface forming the pressure side 18 and the external surface forming the suction side 24. The second and third microcircuits 20 and 22 are each located in a respective one of the peripheral skin walls 13 and 15.

Figure 2:
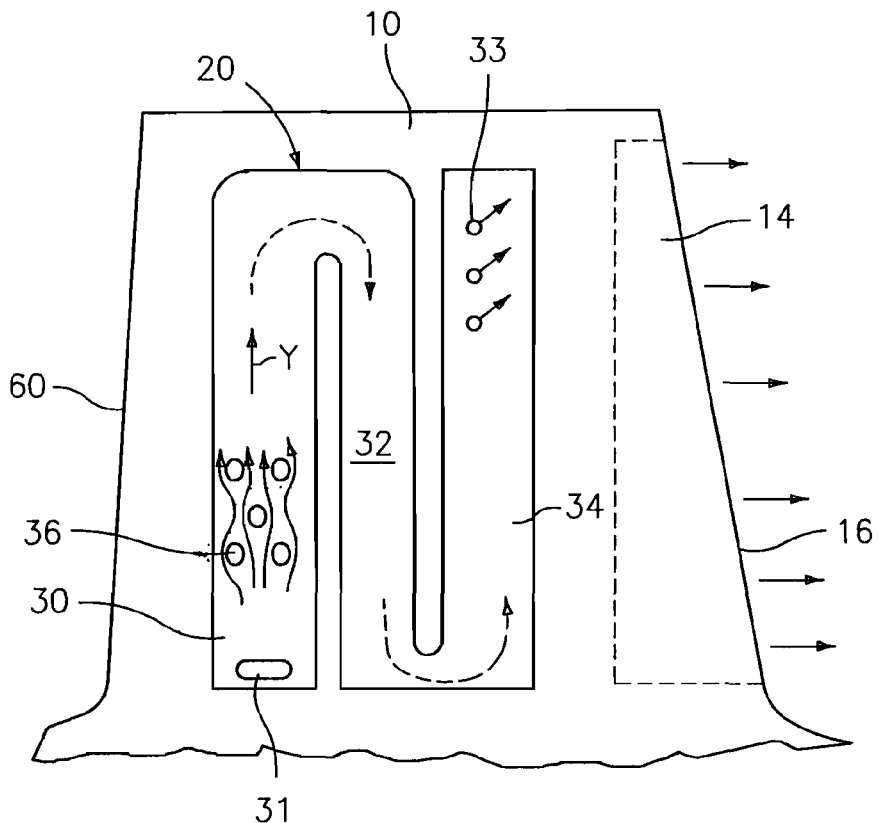
FIG. 2 is a sectional view of a first serpentine cooling passageway used in the airfoil portion of FIG. 1.
Figure 3:
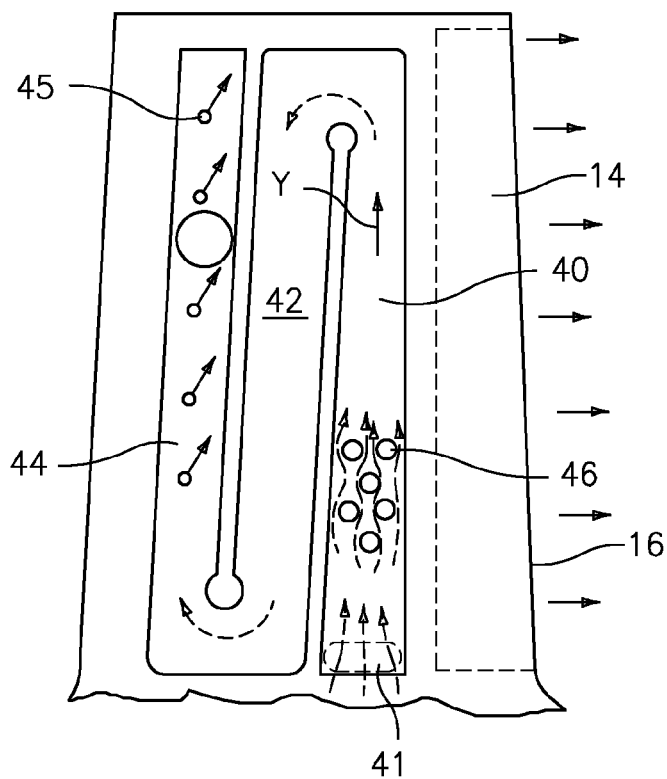
FIG. 3 is a sectional view of a second serpentine cooling passageway used in the airfoil portion of FIG. 1.

As shown in FIGS. 2 and 3, each of the microcircuits 20 and 22 preferably has a serpentine type of arrangement with at least three legs through which a cooling fluid flows. The microcircuits 20 and 22 each may have any number of legs. In the pressure side microcircuit 20, as shown in FIG. 2, cooling fluid may enter an inlet leg 30 through one or more inlets 31, flow through an intermediate leg 32, and exit outward from an outlet leg 34 via one or more cooling film slots 33. The intermediate leg 32 may also be provided with cooling film slots (not shown) if desired). If desired, the inlet leg 30 may be provided with one or more internal features 36, such as rounded pedestals, to enhance the heat transfer characteristics of the microcircuit 20. The internal features 36 may be formed using any suitable technique known in the art. For example, they could be formed using a laser technique. Each inlet 31 is preferably designed so as to force cooling air to flow into the inlet leg 30 in a direction at an angle of less than 25 degrees, preferably substantially normal, to the main cooling flow direction Y in the inlet leg 30. Each inlet 31 is in fluid communication with one of the core elements 12. Causing the inlet flow of cooling fluid to flow in a direction normal to the flow direction Y is particularly important to prevent sand or foreign matter from flowing into the cooling microcircuit 20.

Referring now to FIG. 3, there is shown the suction side microcircuit 22. In this microcircuit, the cooling fluid enters an inlet leg 40 via one or more inlets 41, flows through an intermediate leg 42, and exits outwardly from an outlet leg 44 via film holes 45. The cooling film holes 45 are located ahead of the airfoil gauge external point 47. It has been found that by providing the cooling film holes 45 in this location, the film of cooling fluid better hugs the suction side external surface and thereby increases the effectiveness of the cooling caused by the serpentine passageway microcircuit 22.

If desired, the inlet leg 40 may be provided with internal features 46, such as rounded pedestals, to enhance the heat transfer characteristics of the microcircuit 22. The internal features 46 may be fabricated using any suitable technique known in the art. For example, the internal features 46 may be formed using a laser technique. Each inlet 41 is preferably designed so as to force cooling air to enter the inlet leg 40 in a direction at an angle of less than 25 degrees, preferably substantially normal, to the cooling flow direction Y in the inlet leg 40. As previously noted, this is particularly significant in preventing sand or foreign matter from being introduced into the cooling microcircuit 22. Each inlet 41 communicates with and receives cooling air from one of the central core elements 12. The central core element 12 feeding inlet 41 may be the same one as that feeding the inlet 31. In a preferred embodiment though, the inlet 31 and 41 are fed from different core elements 12. By doing this, the microcircuits 20 and 22 are independent of each other.

The trailing edge microcircuit 14 may have its own supply of cooling fluid from one of the central core elements 12 or may share a supply cavity such as one of the central core elements 12 with the suction side microcircuit 22. The microcircuit 14 may be provided with an inlet (not shown) which causes the cooling fluid flow to turn to enter the cooling microcircuit. As a result, sand and debris will centrifuge out in the central core elements 12.

The leading edge 60 of the airfoil portion 10 may be provided with a cooling microcircuit 62 which has a plurality of cooling film holes 64. The leading edge cooling microcircuit 62 may be supplied with its own cooling flow from its own supply cavity.

If desired, the flow of cooling fluid in the microcircuit 20 may be in a first direction, such as toward the trailing edge 16 of the airfoil portion 10, while the flow of cooling fluid in the microcircuit 22 may be in a second direction toward the leading edge 60 of the airfoil portion. If desired, the flow of cooling fluid in both microcircuits 20 and 22 may be in a single direction.

Figure 4:
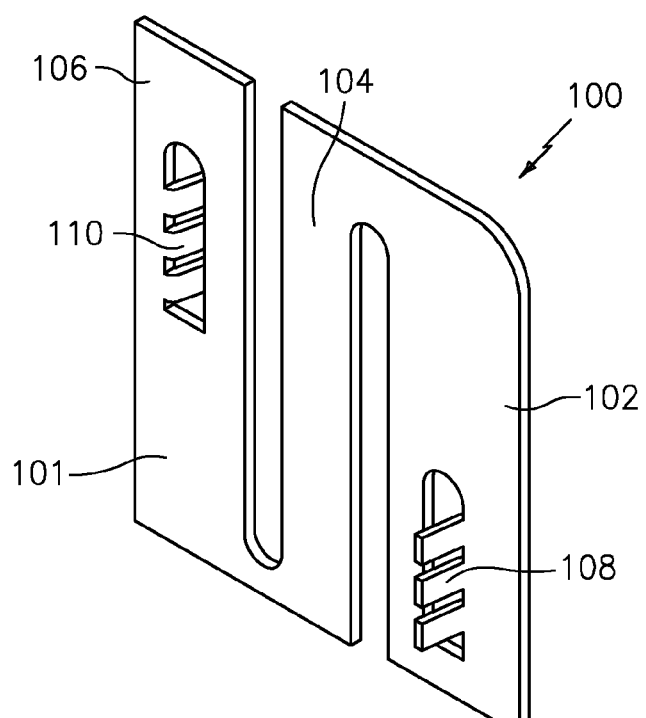
FIG. 4 is a perspective view of a refractory metal core for forming a serpentine cooling passageway.

Each of the microcircuits 20 and 22 are preferably formed using serpentine shaped refractory metal cores 100 such as that shown in FIG. 4. Each refractory metal core 100 may be formed from any suitable refractory metal known in the art such as a metal selected from the group consisting of molybdenum, tantalum, titanium, niobium, and alloys thereof. Each refractory metal core 100 is a sheet 101 of the refractory metal having portions bent out of the sheets to form structures such as the cooling fluid inlets and the film cooling holes. When forming the microcircuit 22, the exits of the refractory metal core 100 on the suction side has to be placed ahead of the airfoil gauge external point 47 for better performance of the microcircuit to be formed. On the pressure side, the refractory metal core 100 may be placed close to the trailing edge 16 to protect the trailing edge microcircuit.

Each metal core 100 used to form the microcircuits 20 and 22 may have a first section 102 for forming the inlet leg of the microcircuit, a second section 104 for forming the intermediate leg(s) of the microcircuit, and a third section 106 for forming the outlet leg of the microcircuit. The first section 102 may have one or more inwardly directed tabs 108 for forming one or more inlets. The third section 106 may have one or more outwardly directed tabs 110 for forming the cooling film holes.

Figure 5:
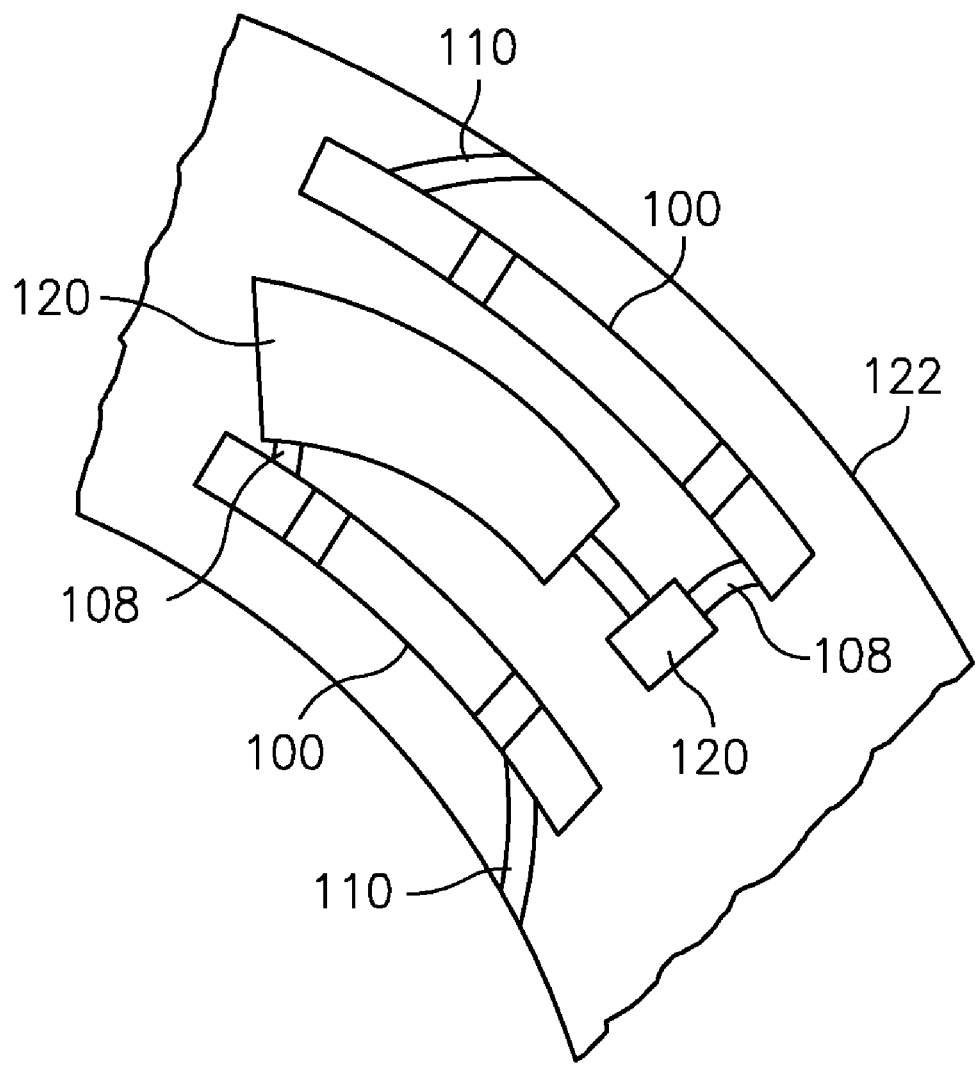
FIG. 5 illustrates a portion of a die for manufacturing the airfoil portion.

Referring now to FIG. 5, to form the airfoil portion 10 of the turbine engine component, one or more silica cores 120 are positioned within a die 122. Also positioned within the die 122 are the refractory metal cores 100 with one on a suction side of the silica core(s) 120 and the other on a pressure side of the silica core(s). Appropriate core structures (not shown) may be used to form the leading edge and trailing edge microcircuits 62 and 14 respectively. After the various elements are positioned within the die 122, molten metal material such as a molten nickel-based superalloy is introduced into the die 122 to form the airfoil portion 10 with the various ribs 124 separating the central core elements 12 and the peripheral skin walls 13 and 15. After the cast airfoil portion 10 is separated from the die 122, the silica core(s) 120 and the refractory metal cores 100 may be removed using any suitable technique known in the art. The remaining airfoil portion 10 is that shown in FIG. 1.

Preferably, there are two silica cores 120 positioned within the die 122 separated by a rib to provide each of the refractory metal core circuits to independently avoid pressure biases between the refractory core metal core sink pressures. In addition, and for creep capability, the silica cores 120 may be split further with communicating ribs.

The microcircuits 20 and 22 are preferably formed with cooling passage legs which have a minimal cross sectional area.

The cooling scheme of the present invention may reduce the flow of cooling fluid by 40%. That is, for this application, existing cooling configurations generally require 5.5% flow; whereas, with the configuration of the present invention, the cooling fluid flow could attain values as low as 3.3%. Other advantages to the present invention include increased convective efficiency and large film coverage leading to high overall cooling effectiveness of 75%.

It is apparent that there has been provided in accordance with the present invention a peripheral microcircuit serpentine cooling for turbine airfoils which fully satisfies the objects, means and advantages set forth hereinbefore. While the present invention has been described in the context of specific embodiments thereof, other unforeseeable alternatives, modifications, and variations will become apparent to those skilled in the art having read the foregoing description. Accordingly, it is intended to embrace those unforeseeable alternatives, modifications, and variations as fall within the broad scope of the appended claims.

What is claimed is:

1. A refractory metal core for forming a cooling passageway in an airfoil portion of a turbine engine component, said refractory metal core having a serpentine configuration, said serpentine configuration having a first leg for forming an inlet leg of said cooling passageway, said first leg having at least one first tab for forming at least one inlet extending in a first direction, said at least one first tab being located inwardly of an outer edge of said first leg, a second leg for forming an outlet leg of said cooling passageway, said second leg having at least one second tab extending in a second direction opposed to said first direction for forming at least one cooling hole.

2. The refractory metal core according to claim 1, wherein said refractory metal core is made from a metal selected from the group of molybdenum and molybdenum alloys.

3. The refractory metal core of claim 1, further comprising a third leg for forming an intermediate cooling passageway, said third leg being joined only at a first end to said first leg, and said third leg being joined only at a second end opposed to said first end to said third leg.

4. The refractory metal core of claim 3, further comprising a first slot between said first leg and said third leg, said first slot having an opening adjacent said second end of said third leg, a second slot between said second leg and said third leg, and said second slot having an opening adjacent said first end of said third leg.

5. The refractory metal core of claim 1, wherein said first leg has three spaced apart first tabs and said first direction is an inward direction.

6. The refractory metal core of claim 5, wherein said second leg has three spaced apart second tabs and said second direction is an outward direction.

7. The refractory metal core of claim 1, wherein said first leg has an inner edge and said at least one first tab being located between said outer edge and said inner edge.

8. The refractory metal core of claim 1, wherein said second leg has an outer edge and an inner edge and said at least one tab being located intermediate of said outer edge and said inner edge.

* * * * *